(12) United States Patent
Avakian

(10) Patent No.: US 7,736,543 B2
(45) Date of Patent: Jun. 15, 2010

(54) EXOTHERMIC POLYPHENYLENE SULFIDE COMPOUNDS

(75) Inventor: Roger W. Avakian, Aurora, OH (US)

(73) Assignee: Polyone Corporation, Avon Lake, OH (US)

( * ) Notice: Subject to any disclaimer, the term of this patent is extended or adjusted under 35 U.S.C. 154(b) by 0 days.

(21) Appl. No.: 12/162,335

(22) PCT Filed: Jan. 31, 2007

(86) PCT No.: PCT/US2007/061403

§ 371 (c)(1),
(2), (4) Date: Jul. 25, 2008

(87) PCT Pub. No.: WO2007/090166

PCT Pub. Date: Aug. 9, 2007

(65) Prior Publication Data

US 2009/0008612 A1 Jan. 8, 2009

Related U.S. Application Data

(60) Provisional application No. 60/764,052, filed on Feb. 1, 2006, provisional application No. 60/785,236, filed on Mar. 23, 2006.

(51) Int. Cl.
*H01B 1/24* (2006.01)
*H01B 1/20* (2006.01)
(52) U.S. Cl. ............ 252/511; 252/510; 252/500; 219/200
(58) Field of Classification Search ............ 252/511, 252/510, 500; 219/200
See application file for complete search history.

(56) References Cited

U.S. PATENT DOCUMENTS

| 3,793,716 | A | * | 2/1974 | Smith-Johannsen | 29/611 |
|---|---|---|---|---|---|
| 4,985,175 | A | | 1/1991 | Dziurla et al. | |
| 5,106,538 | A | * | 4/1992 | Barma et al. | 252/511 |
| 5,106,540 | A | * | 4/1992 | Barma et al. | 252/511 |
| 5,173,524 | A | | 12/1992 | Satoh | |
| 5,326,947 | A | * | 7/1994 | Edds et al. | 218/1 |
| 5,371,134 | A | | 12/1994 | Inoue | |
| 5,373,046 | A | * | 12/1994 | Okamura et al. | 524/413 |
| 5,591,382 | A | | 1/1997 | Nahass et al. | |
| 6,331,586 | B1 | * | 12/2001 | Thielen et al. | 524/401 |
| 6,689,835 | B2 | | 2/2004 | Amarasekera et al. | |
| 2003/0205697 | A9 | * | 11/2003 | Hayward et al. | 252/500 |
| 2003/0213939 | A1 | * | 11/2003 | Narayan et al. | 252/500 |
| 2004/0041683 | A1 | * | 3/2004 | Tosaka et al. | 338/22 R |
| 2004/0206941 | A1 | * | 10/2004 | Gurin | 252/500 |
| 2005/0070657 | A1 | | 3/2005 | Elkovitch et al. | |
| 2005/0070658 | A1 | | 3/2005 | Ghosh et al. | |
| 2007/0295942 | A1 | * | 12/2007 | Avakian et al. | 252/506 |
| 2008/0128663 | A1 | * | 6/2008 | Chaput et al. | 252/511 |

OTHER PUBLICATIONS

Patent Abstracts of Japan for JP H0713337, May 23, 1995.

* cited by examiner

*Primary Examiner*—Douglas MC Ginty
(74) *Attorney, Agent, or Firm*—John H. Hornickel

(57) ABSTRACT

Use of an exothermic additive in a polyphenylene sulfide compound results in an extruded or molded thermoplastic article that is electrically conductive and exothermic when connected to a source of electrical energy. Electronic devices benefit from these articles, particularly where ink must be melted for imaging of commercial graphics on a substrate.

18 Claims, 1 Drawing Sheet

EXOTHERMIC POLYPHENYLENE SULFIDE COMPOUNDS

CLAIM OF PRIORITY

This application claims priority from U.S. Provisional Patent Application Ser. No. 60/764,052 filed on Feb. 1, 2006 and U.S. Provisional Patent Application Ser. No. 60/785,236 filed on Mar. 23, 2006. Both applications are incorporated by reference herein.

FIELD OF THE INVENTION

This invention concerns polyphenylene sulfide compositions useful for electronic devices.

BACKGROUND OF THE INVENTION

Electronic devices are concerned with power management, energy consumption, evacuation of heat from, and delivery of heat to, key electronic components. As electronic devices become more sophisticated, alternative materials are sought to reduce weight, cost, and other factors affecting both price and performance.

There are many examples of thermally conductive thermoplastic compounds which are designed to evacuate heat from electronic components that require certain operating temperatures to be productive and efficient. For example, Therma-Tech brand products from PolyOne Corporation are engineered to transport heat away from a key component, such as a microprocessor.

However, there are some electronic devices that require the delivery of heat to key components. Examples of such electronic devices are certain electronic printing devices that require components to be of a certain temperature for delivery of colorants to the imaging media U.S. Pat. No. 6,905,201 describes the use of heat to melt a solid ink into a liquid ink in commercial graphics printers.

U.S. Pat. No. 6,086,791 (Miller) discloses coatings and films of a non-metallic electrically conductive coating composition effective in emitting heat without break-down when connected to a source of electricity, which comprises: (a) a binder; (b) electrically conductive flake carbon black of particle size between about 5 and 500 micrometers; (c) electrically conductive flake graphite of particle size between about 5 and 500 micrometers; (d) a volatile solvent; wherein the weight amount of (b) and (c) together ranges from between about 10 and 75 weight percent based on the non-volatile solids content of the coating composition. U.S. Pat. No. 6,818,156 (Miller) also discloses coating and films using carbon-based materials having particle sizes in the nanometric and micrometric range for emitting heat.

SUMMARY OF THE INVENTION

Unfortunately, films and coatings such as those disclosed by Miller are present only at the surface of an article. Such films and coatings can chip, delaminate, or flake leaving the article untreated.

What the art needs is a compound that melts or degrades only at very high temperatures yet is exothermic throughout the bulk of the compound to deliver heat of a desired temperature to key components of an electronic device such as a commercial graphics printer. Because the compound is exothermic throughout its bulk, there is no possibility of loss of the thermally conductivity because of loss of a treatment on the surface of the component.

The present invention solves that problem in the art by providing a polyphenylene sulfide compound that is exothermic throughout its bulk when connected to a source of electrical energy.

One aspect of the present invention is a high temperature exothermic composition, comprising a polyphenylene sulfide and an exothermic additive.

Another aspect of the present invention is a thermoplastic article, comprising the polyphenylene sulfide composition described above, wherein the article is exothermic throughout the bulk of the article when the article is connected to a source of electrical energy.

Another aspect of the present invention is an electronic device having at least one component comprising a thermoplastic article described above.

"Exothermic additive" for purposes of this invention means a combination of more electrically conductive particles and less electrically conductive particles that can be engineered to provide a specific temperature when the polyphenylene sulfide composition is formed into an article and is powered by electricity.

Employing a combination of particles of carbon black and graphite, in the manner as disclosed in U.S. Pat. No. 6,086, 791 (Miller) or U.S. Pat. No. 6,818,156, dispersed throughout a polyphenylene sulfide compound, an article formed from the compound can become electrically conductive effective to emit heat without break-down of the compound or the thermoplastic article into which it is formed. Because the melting or other degradation point of polyphenylene sulfide is higher than the temperature desired for the components of the electronic device, it is possible to engineer any specific temperature of heat emitted from a thermoplastic article of the present invention.

Advantages of the invention are explained with reference to the following embodiments.

EMBODIMENTS OF THE INVENTION

Polyphenylene Sulfides

Figure 1:
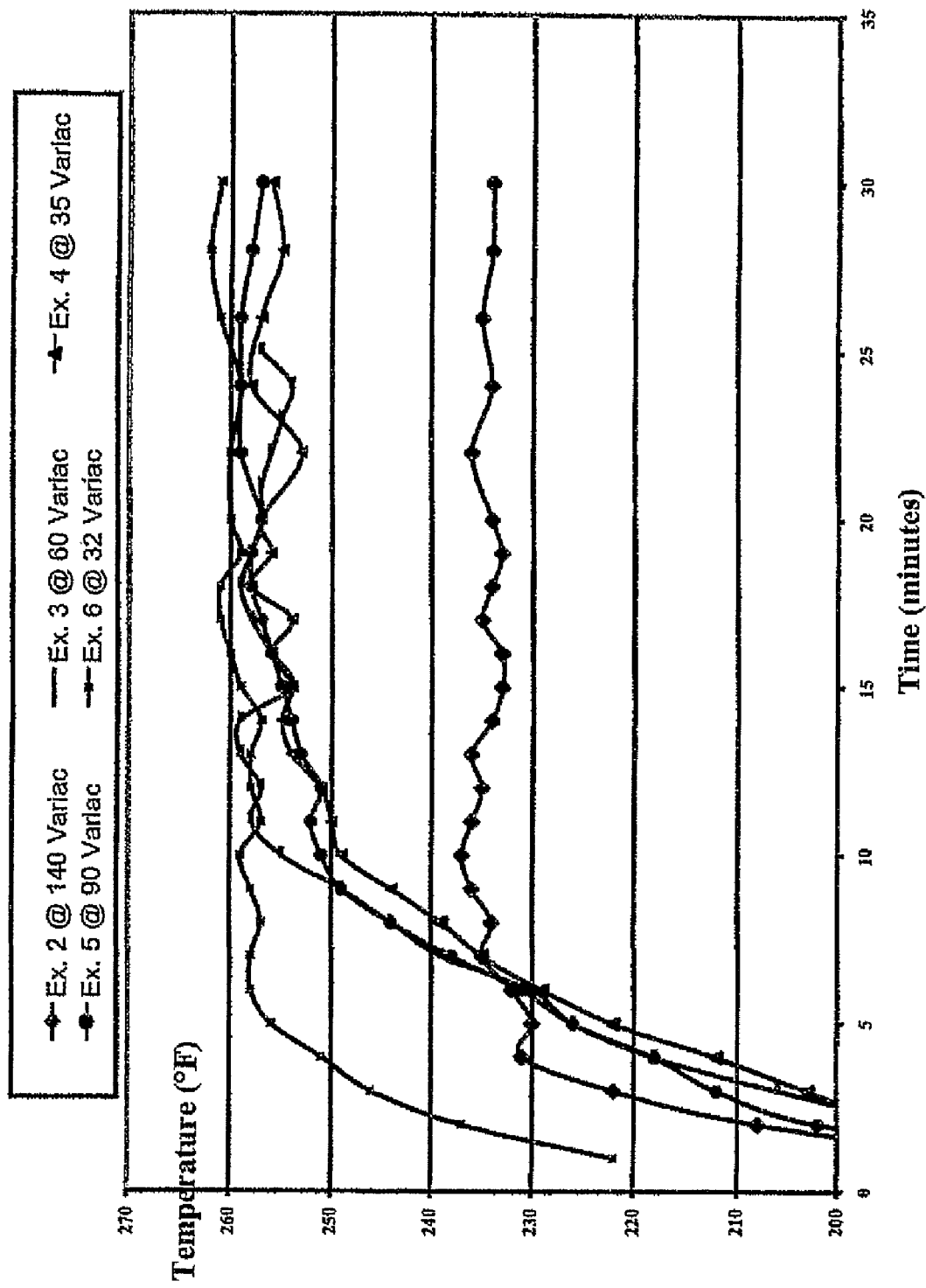
FIG. 1 is a chart plotting temperature vs. time for Examples 2-6.

Polyphenylene sulfides are polymers containing a phenyl moiety and one or more sulfides bonded thereto. Those skilled in the art will recognize the variety of commercially available polyphenylene sulfides are suitable for use in the present invention. Non-limiting examples of such commercially available polyphenylene sulfides ("PPS") include Ryton brand PPS powders in various grades from Chevron Phillips Chemical Co. of The Woodlands, Tex. Any of the patents in the literature known to those skilled in the art are appropriate for determining a suitable choice, without undue experimentation.

Exothermic Additive

The exothermic additive for the present invention is the combination of two different forms of carbon, preferably a combination of particles of carbon black and particles of graphite. The carbon black is more electrically conductive than graphite. Non-limiting examples of substitutes for carbon black include nanotubes (single-walled and multi-walled), nanofibers, and other forms of carbon that have a high aspect ratio and are electrically conductive.

An acceptable commercially available carbon black is Printex XE2 super conductive carbon black particles having a particle size of about 35 nm, from Degussa of Akron, Ohio, among other locations.

An acceptable commercially available graphite is No. 2939 Thermally Pur. Flake graphite having a particle size of less than about 20 microns, from Superior Graphite (www.superiorgraphite.com).

Both the Printex XE2 carbon black and No. 2939 graphite are disclosed in the Miller patents.

The size of the two different forms of carbon can be any size within the nanometric or micrometric region. The aspect ratio of the two different forms of carbon can be any range customarily found in the various forms of carbon useful for the present invention, such as almost 1:1 for spherical particles to about 20,000:1 for nanotubes.

For reasons explained in U.S. Pat. No. 6,086,791 (Miller) and U.S. Pat. No. 6,818,156 (Miller) the combination of carbon black particles and graphite particles generate heat in a manner that can be engineered to provide a specific temperature resulting from a specific amount of electrical energy applied to a specific formulation of the thermoplastic compound. Without undue experimentation and beginning with the disclosures of the Miller patents identified above, one skilled in the art can add an amount of carbon black particles and an amount of graphite particles to produce a compound that is electrically conductive and exothermic when connected to a source of electrical energy.

A balance of carbon black particles and graphite particles can provide both electrical conductivity via the carbon black particles to transport electrical energy throughout the bulk of the polyphenylene sulfide and while also generating heat because of the less conductive or resistive nature of the graphite particles. Unexpectedly from the disclosures of the Miller patents, the combination of two different forms of carbon can be dispersed into bulk of an article formed from a polyphenylene sulfide compound to provide electrical conductivity and exothermic properties. The Miller patents do not disclose polyphenylene sulfide as a suitable binder for his coatings and films.

The weight ratio of more conductive:less conductive portions of carbon forms in the exothermic additive can range from about 0.3:1 to about 3:1.

The cumulative amount of exothermic additive can range from about 1 to about 75 weight percent of the total thermoplastic compound. Generally at a constant ratio of more conductive/less conductive carbonaceous particles, the greater the concentration of exothermic additive, the more exothermic the thermoplastic compound at a given amount of applied electrical energy.

Optional Other Polymers

The compound of the present invention can include additional polymer resins to alter the morphology or rheology of the compound. The other polymers can be compatible with PPS in order to form blends or incompatible with PPS in order to form a continuous/discontinuous two-phase polymeric system.

Non-limiting examples of other optional polymers include polyolefins, polyamides, polyesters, polyhalo-olefins, and polyurethanes. Presently preferred among these optional polymers are polyolefins such as polyethylenes, and more preferably high density polyethylenes (HDPE), in order to reduce brittleness of molded parts made from compounds of the present invention.

The cumulative amount of optional other polymers can range from 0 to about 25 weight percent of the total thermoplastic compound.

Optional Additives

The compound of the present invention can include conventional plastics additives in an amount that is sufficient to obtain a desired processing or performance property for the compound. The amount should not be wasteful of the additive nor detrimental to the processing or performance of the compound. Those skilled in the art of thermoplastics compounding, without undue experimentation but with reference to such treatises as *Plastics Additives Database* (2004) from Plastics Design Library (www.williamandrew.com), can select from many different types of additives for inclusion into the compounds of the present invention.

In compounding PPS, other compounding ingredients are desirably incorporated into the PPS to produce compounding formulas. Other compounding ingredients can include fillers, pigments and colorants if desired, processing lubricants, impact modifiers, uv-stabilizers, other processing aids, as well as other additives such as biocides or flame retardants.

Fillers ordinarily are used to reduce cost and gloss and can include conventional calcium carbonates, clay, talc, mica, and diatomaceous earth fillers. Useful pigments and colorants can be organic, but preferably mineral such as titanium dioxide (which also serves as a uv-stabilizer).

Impact modifiers are useful in PPS to increase toughness and can include chlorinated polyethylenes, ABS, acrylic polymers and copolymers, or methacrylic copolymers such as methylmethacrylate-butadiene-styrene (MBS).

Other processing aids for extruding PPS in complex profiles include acrylic or styrene-acrylonitrile copolymers to prevent edge tear in the extrusion of complex profiles or configurations.

Lubricants can be used to reduce sticking to hot processing metal surfaces and can include polyethylene, paraffin oils, and paraffin waxes in combination with metal stearates. Other lubricants include metal carboxylates, and carboxylic acids.

The cumulative amount of optional additives can range from 0 to about 40 weight percent of the total thermoplastic compound, depending on the type of additive and desired processing or performance property to be changed from the compound without such additive(s) therein. Without undue experimentation, one skilled in the art can determine the appropriate amounts using statistical techniques such as Design of Experiments.

Processing

The preparation of compounds of the present invention is uncomplicated to those skilled in the art of thermoplastic compounding. The compound of the present can be made in batch or continuous operations.

Mixing in a continuous process typically occurs in an extruder that is elevated to a temperature that is sufficient to melt the polymer matrix with addition either at the head of the extruder or downstream in the extruder of the solid ingredient additives. Extruder speeds can range from about 50 to about 500 revolutions per minute (rpm), and preferably from about 100 to about 300 rpm. Typically, the output from the extruder is pelletized for later extrusion or molding into polymeric articles.

Prior to extruding at temperatures sufficient to melt the PPS, the ingredients are physically mixed together using a Henschel mixer. Contrary to the disclosures of the Miller patents which teach grinding the carbon black particles with the graphite particles, the processing of the present invention begins with mixing of carbon black with the PPS followed by addition of the graphite. This order of mixing improves dispersion of both constituents of the exothermic additive within and throughout the bulk of the extruded PPS article.

Mixing in a batch process typically occurs in a Banbury mixer that is also elevated to a temperature that is sufficient to melt the polymer matrix to permit addition of the solid ingredient additives of any optional additive. The mixing speeds range from 60 to 1000 rpm and temperature of mixing can be ambient. Also, the output from the mixer is chopped into smaller sizes for later extrusion or molding into polymeric articles.

Compounds can be formed into powder, cubes, or pellets for further extrusion or molding into polymeric electronic device components.

Subsequent extrusion or molding techniques are well known to those skilled in the art of thermoplastics polymer engineering. Without undue experimentation but with such references as "Extrusion, The Definitive Processing Guide and Handbook"; "Handbook of Molded Part Shrinkage and Warpage"; "Specialized Molding Techniques"; "Rotational Molding Technology"; and "Handbook of Mold, Tool and Die Repair Welding", all published by Plastics Design Library (www.williamandrew.com), one can make articles of any conceivable shape and appearance using compounds of the present invention.

USEFULNESS OF THE INVENTION

Compounds of the present invention can be made into articles which generate heat when connected to electrical energy. One can connect a source of electrical energy via electrodes to an article made from a compound of the present invention, to generate heat sufficient to raise the temperature of a component of the electronic device to a desired amount. The temperature can be controlled by a rheostat which controls electrical energy input to the thermoplastic article.

If there is any concern about the amount of electrical energy that is being delivered to the article, one can also include any type of current arrestor, such as all inline fuse, to assure that no more than a specific amount of electrical energy is to be delivered to the exothermic thermoplastic article of the present invention. An inline fuse would forestall excessive electrical energy being delivered to the article that would otherwise generate such heat as to degrade or melt the polyphenylene sulfide in the article or harm any component of an electronic device in the vicinity of the thermoplastic article.

Any form of electrode is suitable for connecting articles of the invention to the source of electrical energy. Ranging from alligator metal clips from a consumer retail outlet such as Radio Shack stores to pressure sensitive electrodes from a commercial wholesale outlet such as 3M Company, the goal of the electrode is to connect the article to the source of electrical energy without excessive loss of energy.

The amount and type of exothermic additive in the compound establishes the temperature at which an article remains, given the environment within which the article resides.

Contrasted with a coating or film as disclosed in the Miller patents, which might be susceptible to chipping or flaking from the exposed surface of the article, having the exothermic additive dispersed throughout the bulk of the thermoplastic polyphenylene sulfide compound assures continued performance even if the exposed surface of the article is scratched or marred.

Depending on the geometry of the article, one may need to provide more than one set of electrodes to the article, perhaps providing the electrical energy to various sections of the article.

Moreover, it is quite possible to engineer the article to have different sections made from different compounds having different concentrations of exothermic additive dispersed therein, thereby resulting in different temperatures in the different sections by design.

Electronic devices that can benefit from compounds of the present invention are too numerous to exhaustively list. Non-limiting examples of electronic devices include those disclosed in U.S. Pat. Nos. 4,814,786; 5,123,961; 5,621,444; 6,860,591; and 6,905,201 and U.S. Published Patent Applications US 2004/0114008 and US 2004/0114010, especially the ink melter assembly disclosed in U.S. Pat. No. 6,905,201.

Examples further explain the invention.

EXAMPLES

Example 1

Samples of compounds of the present invention were compounded, extruded, and molded into test plaques. All samples were composed of 82.5 weight percent Ryton brand PPS, 12.25 weight percent Printex XE2 brand carbon black particles, and 5.25 weight percent Superior Graphite No. 2939 brand graphite particles, from a production run totaling 50 pounds.

The carbon black was dry-mixed in a Henschel mixer for about 3 minutes followed by addition of PPS and mixing for about 4 minutes, followed by addition of the graphite and continued mixing for about 6 minutes. Then the dry-blend of the compound was introduced into a Century 30 extruder, with the settings and results shown in Table 1.

TABLE 1

| Extruder Conditions | | |
|---|---|---|
|  | Set | Read |
| Zone 1 (° F.) | 680 | 408 |
| Zone 2 (° F.) | 680 | 552 |
| Zone 3 (° F.) | 680 | 678 |
| Zone 4 (° F.) | 680 | 706 |
| Zone 5 (° F.) | 680 | 678 |
| Zone 6 (° F.) | 670 | 668 |
| Zone 7 (° F.) | 670 | 669 |
| Zone 8 (° F.) | 670 | 666 |
| Zone 9 (° F.) | 670 | 664 |
| Die 2 (° F.) | 690 | 690 |
| Die 1 (° F.) | 690 | 690 |
| RPM/Side screw RPM | 400 | X |
| % Torque |  | 24% |
| Melt Press | X | 28 |
| Melt Temp (° F.) | X | 721 |
| Feeder Rate #__1___/M |  | 226 |
| Vacuum/Inches |  | 15 |
| Belt Speed |  | 10 |
| Pelletizer Speed |  | 2/10. |
| Water Spray |  | X |
| Air Blower |  | 1 |
| Rate (Pounds/Hour) |  | 30HR |

The extrudate was pelletized for later molding.

Using a 33 Cincinnati Millacron molding machine, the following settings were used to mold plaques and tensile test bars of the compound of the present invention.

TABLE 2

| Molding Conditions | |
|---|---|
| Drying Conditions: | |
| Temperature | 100° C. |
| Time | 3 |
| Temperatures: | |
| Nozzle (° C.) | 620° |
| Zone 1 (° C.) | 610° |

TABLE 2-continued

Molding Conditions

| | |
|---|---|
| Zone 2 (° C.) | 600° |
| Zone 3 (° C.) | 590° |
| Mold (° F.) | 205° |
| Oil Temp (° C.) | 94.6° |
| Speeds: | |
| Screw RPM | |
| Shot (in) - Inj Vel Stg 1 (in/sec) | 2.5 |
| Shot (in) - Inj Vel Stg 2 (in/sec) | 2 |
| Shot (in) - Inj Vel Stg 3 (in/sec) | 1.5 |
| Shot (in) - Inj Vel Stg 4 (in/sec) | 1 |
| Shot (in) - Inj Vel Stg 5 (in/sec) | 0 |
| Pressures: | |
| Hold Stg 1 (PSI) - Time(sec) | 600 |
| Hold Stg 2 (PSI) - Time(sec) | |
| Timers: | |
| Injection Hold (sec) | 6 |
| Cooling Time (sec) | 20 |
| Operation Settings: | |
| Shot Size | 2.5 |
| Cushion | 0.33 |
| Cut-Off Position | 0.8 |
| Cut-Off (XFER) Pressure | N/A |
| Cut-Off Time | 10 |
| Cut-Off Mode | Pos. |
| Decompression | 0.2 |

Table 3 shows physical properties of the test plaques with two tests and establishment of an average value.

TABLE 3

Physical Properties

| Physical Property | Test 1 | Test 2 | AVG |
|---|---|---|---|
| Izod (ft./lb.) | 0.3 | 0.3 | 0.3 |
| Flexural Modulus (psi) | 845 | 830 | 837.5 |
| Tensile Modulus (ksi) | 1016 | 934 | 975 |
| Stress at Break (psi) | 6644 | 5571 | 6108 |
| Strain at Break % | 0.79 | 0.64 | 0.715 |
| Heat Deflection Temperature @ 66 psi | 234 | 218 | 226 |
| Heat Deflection Temperature @ 264 psi | 107 | 115 | 111 |
| Specific Gravity | 1.429 | — | 1.429 |
| Mold Shrinkage | 0.009924 | 0.009921 | 0.009923 |

To measure exothermic properties, two holes were drilled into a conventional tensile test bar at opposite ends approximately 6 inches apart in order to attach brass screws. Probes from a Variac voltage rheostat were then attached to the brass screws to create a voltage loop. An IR gun was affixed at approximately 4 inches above the tensile bar to measure surface temperature at the center of the bar.

Started with Variac settings at 10 volts, the Variac setting was gradually increased until desired surface temperature reached approximately 350-360° F., a temperature desired for the melting of ink in a commercial graphics ink jet printer. Thereafter, the Variac setting remained constant and while temperature readings were taken every minute (for 30-40 min) while checking to see if temperature readings remained constant. Table 4 shows the measurements at the Variac setting of 33 volts, proving that a given voltage will achieve a constant temperature for more than 30 minutes from exothermic compounds of the present invention.

TABLE 4

33 Variac

| Time (min.) | ° F. |
|---|---|
| 0 | 345 |
| 1 | 359 |
| 2 | 362 |
| 3 | 372 |
| 4 | 374 |
| 5 | 373 |
| 6 | 373 |
| 7 | 372 |
| 8 | 371 |
| 9 | 370 |
| 10 | 373 |
| 11 | 375 |
| 12 | 376 |
| 13 | 375 |
| 14 | 375 |
| 15 | 375 |
| 16 | 375 |
| 17 | 377 |
| 18 | 372 |
| 19 | 374 |
| 20 | 376 |
| 21 | 376 |
| 22 | 373 |
| 23 | 379 |
| 24 | 376 |
| 25 | 375 |
| 26 | 374 |
| 27 | 374 |
| 28 | 374 |
| 29 | 378 |
| 30 | 375 |
| 31 | 371 |

Examples 2-6

Table 5 shows the formulations of Examples 2-6, which are the same as Example 1 except that HDPE is added to improve resistance to brittleness of a final molded part made from the compound. The same compounding and molding conditions were used for Examples 2-6 as were used for Example 1.

TABLE 5

Formulations

| Ingredient (Wt. %) | Example 2 | Example 3 | Example 4 | Example 5 | Example 6 |
|---|---|---|---|---|---|
| PPS (Ryton) | 66.0 | 66.0 | 66.0 | 74.25 | 66.0 |
| Carbon Black (Printex XE2) | 4.2 | 7.0 | 9.8 | 4.725 | 10.0 |
| Graphite (Superior Graphite Pigment No. 2939) | 9.8 | 7.0 | 4.2 | 11.025 | 4.4 |
| HDPE Powder (Solvay No. R21-281) | 20.0 | 20.0 | 20.0 | 10.0 | 20.0 |
| Total Carbon Content in Compound | 14% | 14% | 14% | 15.75% | 14.4% |
| Percentage Carbon Black to Total Carbon Content | 30% | 50% | 70% | 30% | 69% |
| Ratio of Carbon Black to Graphite | 0.43:1 | 1:1 | 2.33:1 | 0.43:1 | 2.27:1 |

Table 6 shows the results at stated Variac settings.

TABLE 6

Temperature Data

| | Variac Setting | | | | |
|---|---|---|---|---|---|
| | 140 V | 60 V | 35 V | 90 V | 32 V |
| | Example | | | | |
| Time (min.) | 2 Temp (° F.) | 3 Temp (° F.) | 4 Temp (° F.) | 5 Temp (° F.) | 6 Temp (° F.) |
| 1 | 183 | 186 | 162.7 | 172.5 | 222 |
| 2 | 208 | 192.6 | 192.5 | 202 | 237 |
| 3 | 222 | 206 | 203 | 212 | 246 |
| 4 | 231 | 218 | 212 | 218 | 251 |
| 5 | 230 | 226 | 222 | 226 | 256 |
| 6 | 232 | 230 | 229 | 231 | 258 |
| 7 | 235 | 239 | 235 | 238 | 258 |
| 8 | 234 | 244 | 239 | 244 | 257 |
| 9 | 236 | 249 | 244 | 249 | 258 |
| 10 | 237 | 255 | 249 | 251 | 259 |
| 11 | 236 | 258 | 250 | 252 | 257 |
| 12 | 235 | 257 | 251 | 251 | 258 |
| 13 | 236 | 259 | 254 | 253 | 258 |
| 14 | 234 | 259 | 255 | 254 | 257 |
| 15 | 233 | 254 | 254 | 255 | 259 |
| 16 | 233 | 256 | 256 | 256 | 260 |
| 17 | 235 | 258 | 254 | 257 | 261 |
| 18 | 234 | 259 | 258 | 258 | 261 |
| 19 | 233 | 258 | 256 | 258 | 259 |
| 20 | 234 | 257 | 257 | 257 | 260 |
| 22 | 236 | 257 | 253 | 259 | 260 |
| 24 | 234 | 256 | 258 | 259 | 259 |
| 26 | 235 | 255 | 257 | 259 | 261 |
| 28 | 234 | 254 | 255 | 258 | 262 |
| 30 | 234 | 257 | 256 | 257 | 261 |

FIG. 1 shows the graphical results numerically listed in Table 6. It is interesting to note that Example 2 with the highest voltage setting yielded the lowest temperature. That may be attributable to Example having the lowest percentage of carbon black to total carbon content, as seen in Table 5. A comparison of Example 2 and Example 5 shows that Example 5 with 50% of the HDPE content and almost the same amount of total carbon content and the same percentage of carbon black to total carbon content is able to achieve a higher temperature at a lower voltage. Therefore, the presence of the optional polymer needs to be taken into consideration when designing a formulation to operate a given temperature for a given voltage.

A comparison of Examples 2-4 shows that for constant amounts of PPS, total carbon content, and HDPE, increase of the amount of carbon black to graphite also increases the exotherm while reducing the amount of Variac voltage from 140 to 35.

Table 7 shows the resistivity data for Examples 2-6, tested initially and then repeated four times to obtain an average value and a standard deviation. A comparison of Examples 2-4 shows a correlation of drop of resistivity as the amount of carbon black to total carbon content increases. A comparison of Example 4 with Example 6 shows that quite minor differences in formulation content can have considerable differences in resistivity. Because Example 6 was compounded at a different time from Examples 2-5, the methods of compound processing may also have an effect.

TABLE 7

Resistivity in Ohms of a Tensile Test Bar Between 2 Brass Screws 11.43 cm apart

| | Initial | Repeat 1 | Repeat 2 | Repeat 3 | Repeat 4 | Average | Std. Dev. |
|---|---|---|---|---|---|---|---|
| Ex. 2 | 1858 | 2870 | 3270 | 1790 | 1910 | 2339.6 | 682.92 |
| Ex. 3 | 852 | 750 | 730 | 460 | 510 | 660.4 | 167.6 |
| Ex. 4 | 313 | 128 | 129 | 293 | 181 | 208.8 | 88.906 |
| Ex. 5 | 1720 | 2080 | 974 | 1850 | 1490 | 1622.8 | 420.91 |
| Ex. 6 | 115 | 101 | 101 | 103 | 106 | 105.2 | 5.8481 |

A comparison of the exotherm results of Table 6 (and FIG. 1) with the resistivity results of Table 7 also shows that the lowest resistivity achieves the highest temperature exotherm at the lowest amount applied voltage. Unexpectedly to those skilled in the art, the temperature desired is inversely related to the resistivity of the formulation.

The invention is not limited to the above embodiments. The claims follow.

What is claimed is:

1. A polyphenylene sulfide composition, comprising:
   (a) polyphenylene sulfide,
   (b) an exothermic additive, and
   (c) high density polyethylene,
   wherein the composition is exothermic when connected to a source of electrical energy and wherein both the exothermic additive and the high density polyethylene contribute to a given temperature at a given voltage.

2. The composition of claim 1, wherein the exothermic additive comprises the combination of two different forms of carbon, and wherein one form is more electrically conductive than the other form.

3. The composition of claim 1, wherein the exothermic additive is a combination of particles of carbon black and particles of graphite, and wherein particles of carbon black are more electrically conductive than particles of graphite.

4. The composition of claim 2, wherein the more electrically conductive form of carbon is selected from the group consisting of particles of carbon black, single-walled nanotubes, multi-walled nanotubes, nanofibers, and combinations thereof.

5. The composition of claim 1, wherein the exothermic additive comprises a form of carbon that has a high aspect ratio and is electrically conductive.

6. The composition of claim 1, wherein the exothermic additive are particles having a size within the nanometric or micrometric region.

7. The composition of claim 1, wherein the exothermic additive are particles having an aspect ratio ranging from about 1:1 to about 20,000:1.

8. The composition of claim 2, wherein the weight ratio of more conductive:less conductive forms of carbon can range from 2.2:1 to about 3:1.

9. The composition of claim 1, wherein the amount of exothermic additive ranges from about 1 to about 75 weight percent of the composition.

10. The composition of claim 3, wherein the weight ratio of more conductive:less conductive forms of carbon can range from 2.2:1 to about 3:1.

11. The composition of claim 3, wherein the amount of exothermic additive ranges from about 1 to about 75 weight percent of the composition.

12. The composition of claim 1, further comprising optional additives selected from the group consisting of fillers, pigments, colorants, processing lubricants, impact modifiers, uv-stabilizers, processing aids, biocides, and flame retardants, wherein the optional additive is present in an amount ranging from 0 to about 25 weight percent of the composition.

13. A method of making the composition of claim 3, comprising the steps of:
  (a) dry mixing the carbon black particles in a mixer;
  (b) adding the polyphenylene sulfide into the mixer and continuing dry mixing;
  (c) adding the graphite particles into the mixer and continuing dry mixing step to form a dry blend; and
  (d) extruding the dry blend in an extruder.

14. A thermoplastic article, comprising the polyphenylene sulfide composition of claim 1, wherein the article is exothermic throughout the bulk of the article when the article is connected to a source of electrical energy.

15. An electronic device, comprising a thermoplastic article of claim 14.

16. The composition of claim 2, wherein the exothermic additive comprises a form of carbon that has a high aspect ratio and is electrically conductive.

17. The composition of claim 2, wherein the exothermic additive are particles having a size within the nanometric or micrometric region.

18. The composition of claim 2, wherein the exothermic additive are particles having an aspect ratio ranging from about 1:1 to about 20,000:1.

* * * * *